United States Patent
Iwama et al.

(10) Patent No.: US 7,941,843 B2
(45) Date of Patent: May 10, 2011

(54) MOBILE WIRELESS COMMUNICATION SYSTEM, MOBILE WIRELESS TERMINAL APPARATUS, VIRTUAL PRIVATE NETWORK RELAY APPARATUS AND CONNECTION AUTHENTICATION SERVER

(75) Inventors: Tomohiro Iwama, Kanagawa (JP); Tomoharu Kaneko, Kanagawa (JP); Yoshikazu Ishii, Osaka (JP)

(73) Assignee: Panasonic Corporation, Osaka (JP)

( * ) Notice: Subject to any disclaimer, the term of this patent is extended or adjusted under 35 U.S.C. 154(b) by 1334 days.

(21) Appl. No.: 10/586,343

(22) PCT Filed: Jan. 11, 2005

(86) PCT No.: PCT/JP2005/000193
§ 371 (c)(1),
(2), (4) Date: Jul. 14, 2006

(87) PCT Pub. No.: WO2005/069567
PCT Pub. Date: Jul. 28, 2005

(65) Prior Publication Data
US 2008/0232382 A1 Sep. 25, 2008

(30) Foreign Application Priority Data

Jan. 15, 2004 (JP) ................................ 2004-008507

(51) Int. Cl.
*G06F 17/00* (2006.01)
(52) U.S. Cl. .......... 726/15; 713/168; 713/171; 370/401; 380/270; 380/277; 380/278

(58) Field of Classification Search .................. 370/270, 370/331, 338, 400, 401; 726/3, 12, 15, 21; 713/168–171; 709/223, 224, 225, 238; 455/410, 455/411, 422.1, 432.1, 435.1, 435.2, 436–444, 455/448, 466, 517, 524, 525, 552.1, 553.1, 455/554.1; 380/247, 248, 255, 258–260, 380/264, 270, 277–278
See application file for complete search history.

(56) References Cited

U.S. PATENT DOCUMENTS 6,813,715 B2 * 11/2004 Yi .................................... 726/15
6,839,338 B1 * 1/2005 Amara et al. .................. 370/338
(Continued)

FOREIGN PATENT DOCUMENTS

JP 2001 177514 6/2001

OTHER PUBLICATIONS

PCT International Search Report dated Apr. 5, 2005.

(Continued)

*Primary Examiner* — Anthony S Addy
(74) *Attorney, Agent, or Firm* — Seed IP Law Group PLLC

(57) ABSTRACT

Mobile wireless communication system 100 of the present invention has virtual private network relay apparatus 105 which establishes an IPsec tunnel with network relay apparatus 104 installed on private network 102 via public network 101, further establishes the IPsec tunnel with mobile wireless terminal apparatus 110 and relays connection of mobile wireless terminal apparatus 110 from public wireless LAN system 103 to private network 102, connection authentication server 108 that authenticates connection of mobile wireless terminal apparatus 110 to public wireless LAN system 103, and wireless LAN access point 109 that relays connection authentication procedures of public wireless LAN 107 performed between mobile wireless terminal apparatus 110 and connection authentication server 108.

12 Claims, 7 Drawing Sheets

U.S. PATENT DOCUMENTS

| | | | | |
|---|---|---|---|---|
| 6,915,437 | B2 * | 7/2005 | Swander et al. | 726/1 |
| 6,976,177 | B2 * | 12/2005 | Ahonen | 726/3 |
| 7,065,067 | B2 * | 6/2006 | Song et al. | 370/338 |
| 7,068,640 | B2 * | 6/2006 | Kakemizu et al. | 370/349 |
| 7,287,269 | B2 * | 10/2007 | Burton et al. | 726/2 |
| 7,441,043 | B1 * | 10/2008 | Henry et al. | 709/238 |
| 7,478,427 | B2 * | 1/2009 | Mukherjee et al. | 726/15 |
| 7,574,603 | B2 * | 8/2009 | Swander et al. | 713/171 |
| 7,624,429 | B2 * | 11/2009 | Van Ackere et al. | 726/3 |
| 7,685,317 | B2 * | 3/2010 | Iyer | 709/248 |
| 2002/0136226 | A1 * | 9/2002 | Christoffel et al. | 370/401 |
| 2005/0149732 | A1 * | 7/2005 | Freeman et al. | 713/171 |
| 2006/0185013 | A1 * | 8/2006 | Oyama et al. | 726/21 |
| 2007/0230453 | A1 * | 10/2007 | Giaretta et al. | 370/389 |

OTHER PUBLICATIONS

Feder, P.M. Lee, N.Y. Martin-Leon, S. A seamless mobile VPN data solution for UMTS and WLAN users, 3G Mobile Communication Technologies, 2003, 3G 2003, 4th International Conference on (Conf. Publ. No. 494), pp. 210-216, Jun. 27, 2003, p. 214 a. IP security (IPsec), VII Network-Based MVPN Enterprise Model.

Y. Sheffer, et al.; "PIC, A Pre-IKE Credential Provisioning Protocol," IPSRA Working Group, Internet-Draft, Category: Standards Track <draft-ietf-ipsra-pic-06.txt>, <http://www.ietf.org/internet-drafts/draft-ietf-ipsra-pic.06.txt>, Oct. 9, 2002, pp. 1-29.

* cited by examiner

MOBILE WIRELESS COMMUNICATION SYSTEM, MOBILE WIRELESS TERMINAL APPARATUS, VIRTUAL PRIVATE NETWORK RELAY APPARATUS AND CONNECTION AUTHENTICATION SERVER

TECHNICAL FIELD

The present invention relates to a mobile wireless communication system, mobile wireless terminal apparatus, virtual private network relay apparatus and connection authentication server to establish a communication path with high security in a mobile VPN connection environment such that access is made from a public network such as a public wireless LAN system to a private network.

BACKGROUND ART

In connection from a public network to a private network, IPsec technique has been standardized by IETF to establish a secure communication path. Supporting the IPsec technique is indispensable in IPv6. It is assumed that IPsec is applied to a mobile environment where a mobile wireless terminal apparatus is capable of moving between a public network and private network freely, and that the mobile wireless terminal apparatus connects to the private network from the public network. In this case, every time the mobile wireless terminal apparatus moves, an IP address usable in a moving-destination public network is assigned by DHCP (Dynamic Host Configuration Protocol) and the like. In other words, the IP address varies with the moving destination of the mobile wireless terminal apparatus.

For this reason, in a security gateway to which an IPsec tunnel that is set in the private network is established, since IP address of each moving destination is required to be known, it becomes difficult to implement an IPsec key exchange using an IP address of the mobile wireless terminal apparatus, and therefore, it is practically impossible to establish the IPsec tunnel by main mode. Accordingly, it becomes necessary to establish the IPsec tunnel by aggressive mode, and an IPsec user ID (ISAKAMPID Payload) is thus communicated between networks without being encrypted, resulting in degradation in security.

Further, it is indispensable in IPsec to support a pre-shared secret key scheme to authenticate each other in both parties that establish the IPsec tunnel. However, the security deteriorates is concerned due to continuous use of a single pre-shared secret key. Then, it is considered that the pre-shared secret key is changed at regular time intervals to maintain the security, however, it imposes heavy loads on both a user and administrator.

As a protocol to dynamically distribute a pre-shared secret key for use in authentication of IPsec, PIC (Pre-IKE Credential Provisioning Protocol) has been proposed in IETF (Internet Engineering Task Force) (see Non-patent Document 1).

PIC establishes a secure communication path between a mobile wireless terminal apparatus and authentication server using ISAKMP (Internet Security Association and Key Management Protocol) that is also used in IPsec, and exchanges authentication information required for authentication in PIC to authenticate. When the authentication succeeds, the authentication server issues to the mobile wireless terminal apparatus authentication information (for example, pre-shared secret key and public key certificate) called a credential for use in subsequent authentication of IPsec.

[Non-patent Document 1] "PIC, A Pre-IKE Credential Provisioning Protocol", draft-ietf-ipsra-pic-06.txt, http://www.ietf.org/internet-drafts/draft-ietf-ipsra-pic-06.txt

DISCLOSURE OF INVENTION

Problems to be Solved by the Invention

When a mobile wireless terminal apparatus connects to a private network such as an intracompany network in a public network such as a public wireless LAN system, the mobile wireless terminal apparatus is considered establishing a secure communication path i.e. IPsec tunnel with the private network using IPsec.

However, in this case, when IPsec is applied to a mobile environment where a mobile wireless terminal apparatus is able to move between a public network and private network freely, an IP address of the mobile wireless terminal apparatus changes every time it moves, and it is thus difficult to exchange an IPsec key by IPsec main mode. For this reason, the IPsec tunnel should be established by an IPsec key exchange in aggressive mode, an IPsec user ID is thus communicated between networks without being encrypted, and a problem arises of resulting in degradation in security.

Further, to establish the tunnel by key exchange of IPsec main mode, an IP address at a moving destination of the mobile wireless terminal apparatus needs to be known. However, an IP address is often assigned by DHCP in a public network such as a public wireless LAN system, and it is thus difficult to beforehand know the IP address of the mobile wireless terminal apparatus. If the IP address of the mobile wireless terminal apparatus in the public wireless LAN system is known, since a security policy needs to be described in each IP address in the public wireless LAN system, problems arise that the performance of the security gateway deteriorates, and that a load is imposed on administration of the administrator.

Furthermore, when the pre-shared secret key system is applied as a mutual authentication system to establish an IPsec tunnel, continuing to use a single pre-shared key results in a problem that the security deteriorates with time. Moreover, it is considered that the pre-shared key is changed at regular time intervals, but in this case, a problem arises that it imposes loads on both the user and administrator.

In order to solve the above-mentioned problems, PIC has been proposed as a protocol to dynamically distribute a pre-shared secret key for use in authentication of IPsec. However, to use PIC, there is a problem that the PIC protocol function needs to be newly added to existing apparatuses. Further, when PIC is applied to IPsec tunnel establishment procedures, a mobile wireless terminal apparatus establishes the communication path by ISAKMP twice, i.e. establishes ISAKMP communication path between the mobile wireless terminal apparatus and connection authentication server by PIC, and establishes ISAKMP communication path between the mobile wireless terminal apparatus and security gateway, and the procedures are thus redundant, resulting in a problem that the time required to establish the IPsec channel becomes long.

It is an object of the present invention to provide a mobile wireless communication system, mobile wireless terminal apparatus, virtual private network relay apparatus and connection authentication server capable of preventing deterioration in security, eliminating the need of the specific operation of a user and administrator, and reducing the time required to establish an IPsec tunnel in a mobile VPN connection environment.

Means for Solving the Problem

A mobile wireless communication system according to the present invention has a public network, a private network and a public wireless LAN system, and employs a configuration comprising: a virtual private network relay apparatus which establishes an IPsec tunnel with a network relay apparatus installed on the private network via the public network, further establishes the IPsec tunnel with a mobile wireless terminal apparatus, and relays connection of the mobile wireless terminal apparatus from the public wireless LAN system to the private network, a connection authentication server that is installed on the public wireless LAN system and that authenticates connection of the mobile wireless terminal apparatus to the public wireless LAN system, and a wireless LAN access point that relays connection authentication procedures of the public wireless LAN performed between the mobile wireless terminal apparatus and the connection authentication server.

ADVANTAGEOUS EFFECT OF THE INVENTION

According to the present invention, it is possible to prevent deterioration in security, eliminate the need of the specific operation of a user and administrator, and reduce the time required to establish an IPsec tunnel in a mobile VPN connection environment.

BEST MODE FOR CARRYING OUT THE INVENTION

An embodiment of the present invention will specifically be described below with reference to accompanying drawings.

Embodiment

Figure 1:
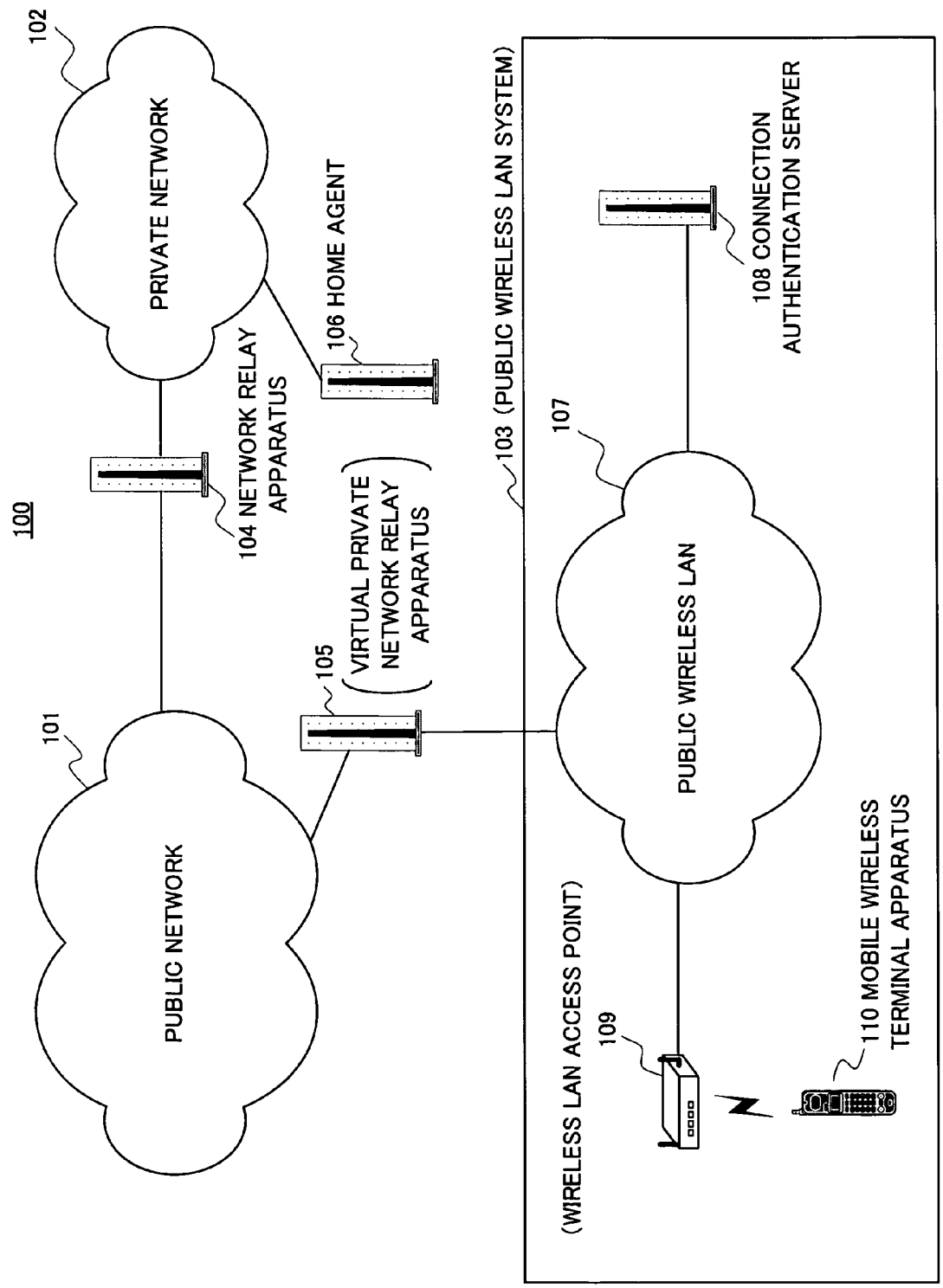
FIG. 1 is a diagram illustrating the configuration of the mobile wireless communication system according to the embodiment of the present invention.

As shown in FIG. 1, mobile wireless communication system 100 according to the embodiment of the invention has public network 101, private network 102, public wireless LAN system 103, network relay apparatus 104, virtual private network relay apparatus 105, and home agent 106. Public wireless LAN system 103 has public wireless LAN 107, connection authentication server 108, wireless LAN access point 109 and a plurality of mobile wireless terminal apparatuses 110 (only one apparatus is shown.)

Virtual private network relay apparatus 105 statically establishes an IPsec tunnel with network relay apparatus 104 installed on private network 102 via public network 101, and realizes secure communication between virtual private network relay apparatus 105 and private network 102. Further, virtual private network relay apparatus 105 establishes an IPsec tunnel with mobile wireless terminal apparatuses 110 existing in public wireless LAN system 103, and relays connection of mobile wireless terminal apparatuses 110 from public wireless LAN system 103 to private network 102. In addition, the IPsec tunnel between virtual private network relay apparatus 105 and mobile wireless terminal apparatus 110 is dynamically established whenever the mobile wireless terminal apparatus 110 connects to public wireless LAN system 103, and further dynamically established whenever the mobile wireless terminal apparatus 110 requests the connection to private network 102.

Connection authentication server 108 performs connection authentication of mobile wireless terminal apparatus 110 to public wireless LAN 107. At this point, wireless LAN access point 109 performs the function of relaying connection authentication procedures performed between mobile wireless terminal apparatus 110 and connection authentication server 108.

Figure 2:
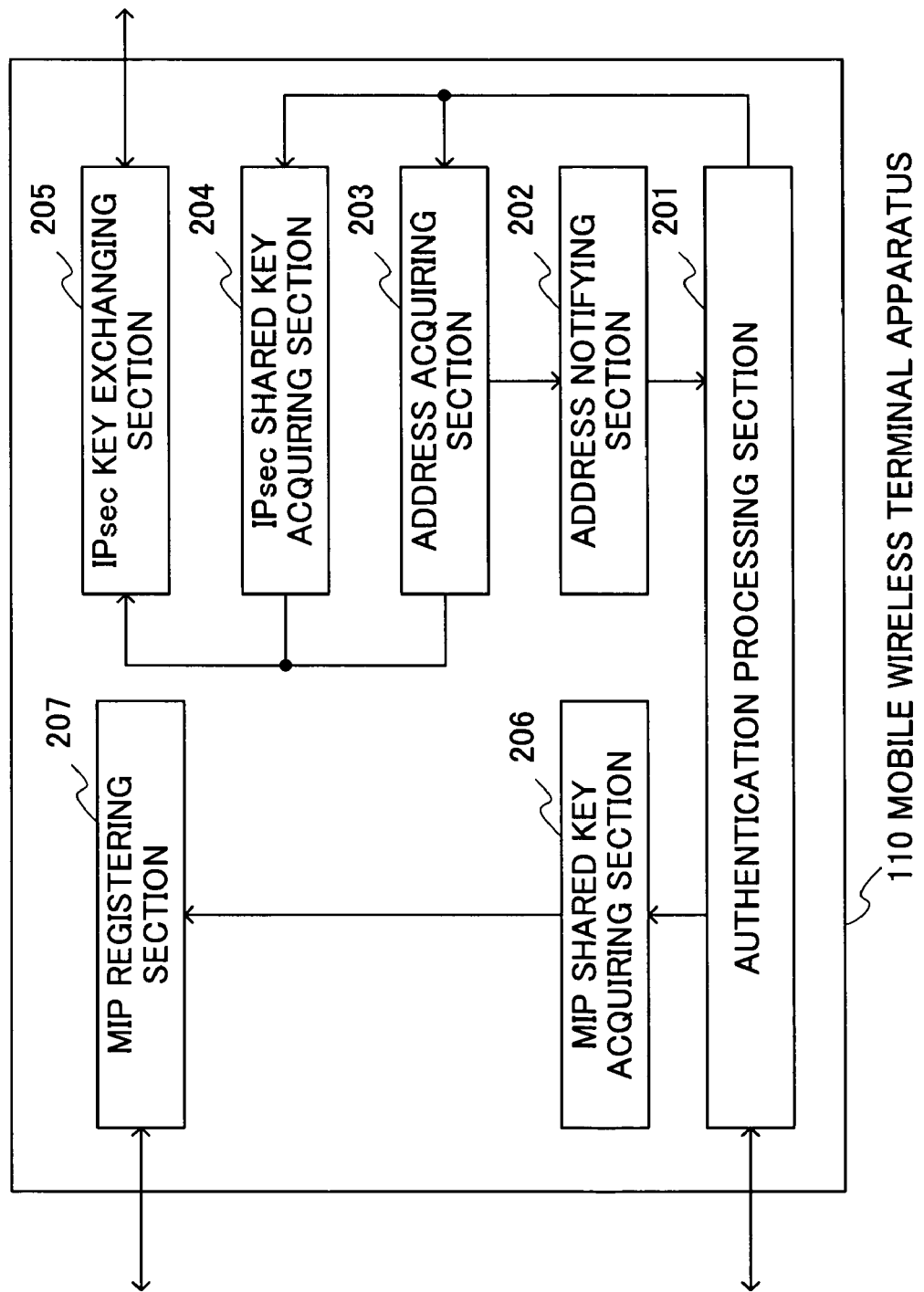
FIG. 2 is a block diagram illustrating the configuration of the mobile wireless terminal apparatus according to the embodiment of the invention.
Figure 3:
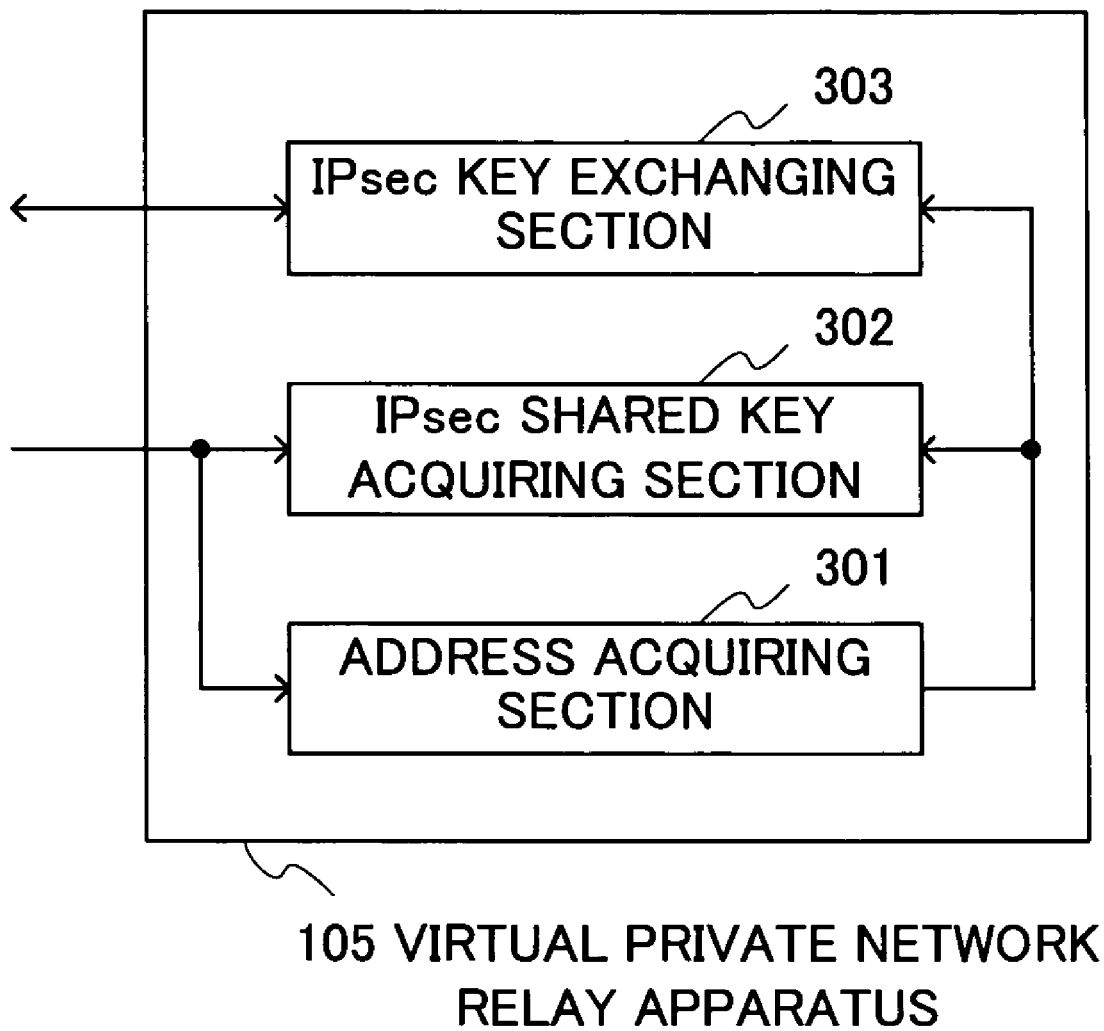
FIG. 3 is a block diagram illustrating the configuration of the virtual private network relay apparatus according to the embodiment of the invention.
Figure 4:
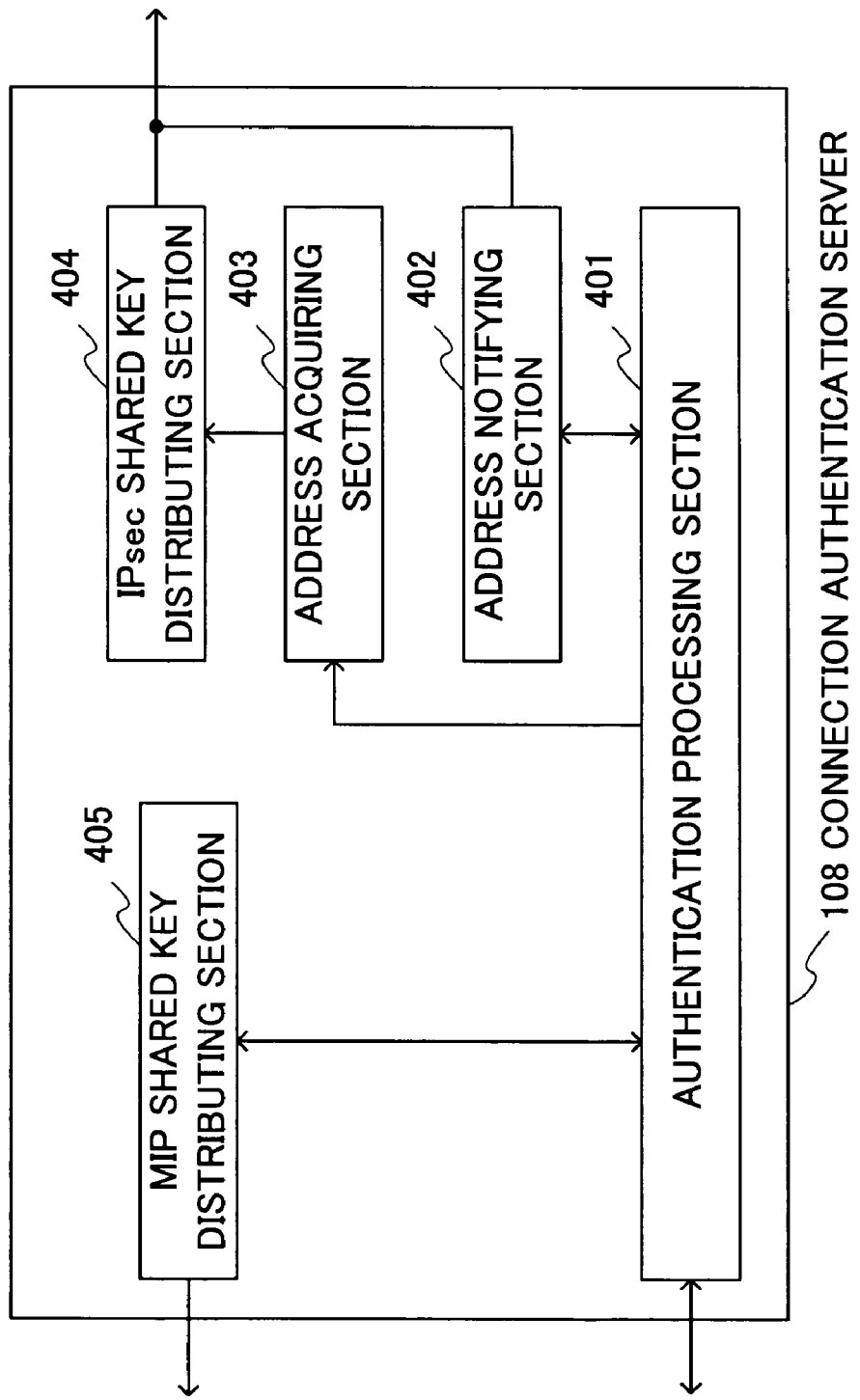
FIG. 4 is a block diagram illustrating the configuration of the connection authentication server according to the embodiment of the invention.
Figure 5:
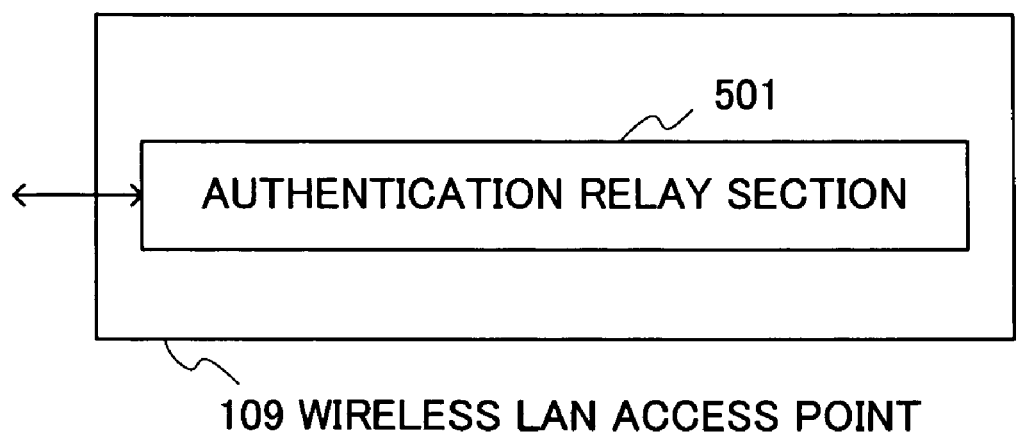
FIG. 5 is a block diagram illustrating the configuration of the wireless access point according to the embodiment of the invention.
Figure 6:
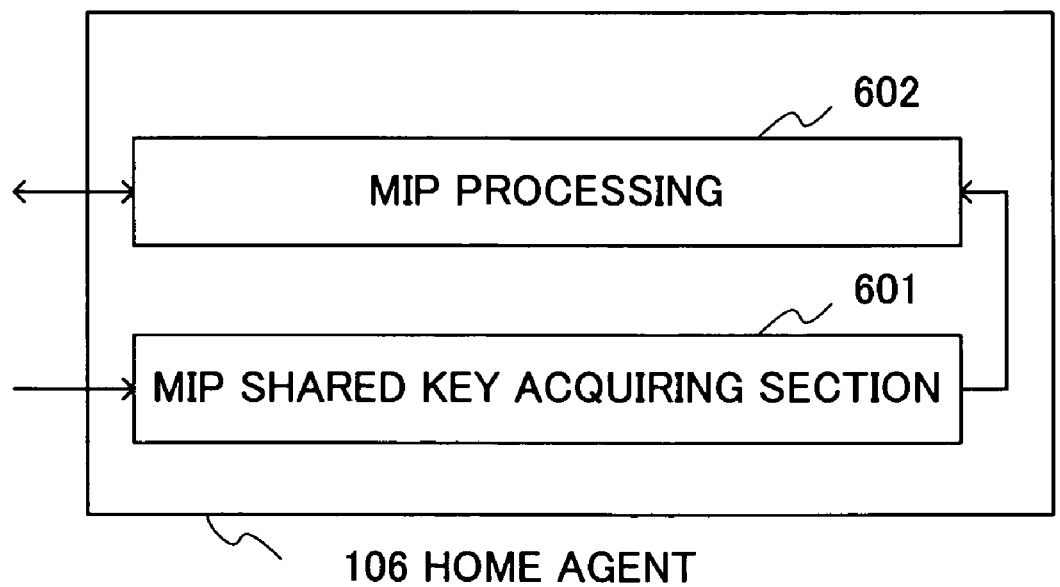
FIG. 6 is a block diagram illustrating the configuration of the home agent according to the embodiment of the invention.

FIG. 2 is a block diagram illustrating a configuration of mobile wireless terminal apparatus 110 according to the embodiment of the invention. FIG. 3 is a block diagram illustrating a configuration of virtual private network relay apparatus 105 according to the embodiment of the invention. FIG. 4 is a block diagram illustrating a configuration of connection authentication server 108 according to the embodiment of the invention. FIG. 5 is a block diagram illustrating a configuration of wireless LAN access point 109 according to the embodiment of the invention. FIG. 6 is a block diagram illustrating a configuration of home agent 106 according to the embodiment of the invention.

As shown in FIG. 2, mobile wireless terminal apparatus 110 has authentication processing section 201, address notifying section 202, address acquiring section 203, IPsec shared key acquiring section 204, IPsec key exchanging section 205, MIP shared key acquiring section 206 and MIP registering section 207. In addition, mobile wireless terminal apparatus 110 has an apparatus (not shown) performing mobile wireless communication.

As shown in FIG. 3, virtual private network relay apparatus 105 has address acquiring section 301, IPsec shared key acquiring section 302, and IPsec key exchanging section 303. As shown in FIG. 4, connection authentication server 108 has authentication processing section 401, address notifying section 402, address acquiring section 403, IPsec shared key distributing section 404, and MIP shared key distributing section 405. As shown in FIG. 5, wireless LAN access point 109 has authentication relay section 501. As shown in FIG. 6, home agent 106 has MIP shared key acquiring section 601 and MIP processing section 602.

Next, procedures of a case where mobile wireless terminal apparatus 110 existing in public wireless LAN system 103 connects to private network 102 will be explained as an example.

When mobile wireless terminal apparatus 110 exists within a communication range of public wireless LAN system 103, to connect to public wireless LAN system 103, authentication processing section 201 of mobile wireless terminal apparatus 110 transmits a connection request to authentication processing section 401 of connection authentication server 108 via authentication relay section 501 of wireless LAN access point 109. As a protocol to connect to public wireless LAN system 103, there may be 802.1x specified by IEEE (the Institute of Electrical and Electronics Engineers) and the like.

For simplicity of the explanation, procedures of the case using 802.1x will be described below. In the framework of 802.1x, the EAP (Extensible Authentication Protocol) protocol is applied to between mobile wireless terminal apparatus 110 and wireless LAN access point 109. Further, the RADIUS (Remote Authentication Dial In User Service) protocol or the like is applied to between wireless LAN access point 109 and connection authentication server 108. Wireless LAN access point 109 has the bridge function of relaying protocols of both parties.

Authentication processing section 401 of connection authentication server 108 first performs authentication of the connection request transmitted from authentication processing section 201 of mobile wireless terminal apparatus 110. The authentication is performed using various authentication systems such as EAP-MD5, EAP-TLS, EAP-LEAP or PEAP. Here, for simplicity of explanation, procedures of the case using EAP-TLS will be described. In EAP-TLS, mobile wireless terminal apparatus 110 and connection authentication server 108 exchange an electronic certificate, thereby authenticating each other.

Further, at the same time, mobile wireless terminal apparatus 110 and connection authentication server 108 exchange random numbers and perform computation processing using a pseudo random-number function or the like, thereby holding a master secret common to each other. Mobile wireless terminal apparatus 110 and connection authentication server 108 generate PMK (Pairwise Master Key) from the master secret. Then, when connection authentication server 108 succeeds in authenticating mobile wireless terminal apparatus 110, mobile wireless terminal apparatus 110 and connection authentication server 108 encrypt a communication path between connection authentication server 108 and mobile wireless terminal apparatus 110 using the master secret.

At this point, authentication relay section 501 of wireless LAN access point 109 serves as relaying the communication path, and therefore, it is possible to perform the secret communication between mobile wireless terminal apparatus 110 and connection authentication server 108. In other words, a secure communication path is established among authentication processing section 201 of mobile wireless terminal apparatus 110, authentication relay section 501 of wireless LAN access point 109 and authentication processing section 401 of connection authentication server 108. Subsequently, unless otherwise specified, the communication among mobile wireless terminal apparatus 110, wireless LAN access point 109 and connection authentication server 108 is performed using this secure communication path.

Then, connection authentication server 108 transmits PMK to wireless LAN access point 109 using the encrypted secure communication path. By this, Mobile wireless terminal apparatus 110 and wireless LAN access point 109 generate a WEP key from shared PMK, and encrypt a wireless communication domain communication path in public wireless LAN system 103 using the WEP key (step ST1 in FIG. 7).

Next, using the communication path encrypted by the master secret shared between mobile wireless terminal apparatus 110 and connection authentication server 108, an IP address of virtual private network relay apparatus 105 is exchanged with an IP address of mobile wireless terminal apparatus 110. Address notifying section 402 of connection authentication server 108 transmits the IP address of virtual private network relay apparatus 105 to address acquiring section 203 of mobile wireless terminal apparatus 110 via authentication relay section 501 of wireless LAN access point 109.

In addition, it is considered that connection authentication server 108 before handholds the IP address of virtual private network relay apparatus 105. Address acquiring section 203 of mobile wireless terminal apparatus 110 having received the IP address of virtual private network relay apparatus 105 outputs a signal to address notifying section 202. Address notifying section 202 having received the signal transmits an IP address assigned to the apparatus 110 to address acquiring section 403 of connection authentication server 108 via authentication relay section 501 of wireless LAN access point 109 (step ST3 in FIG. 7).

Further, in order for connection authentication server 108 and mobile wireless terminal apparatus 110 to transmit and receive the IP address, the EAP protocol and EAPOL protocol are extended. In order for authentication processing section 401 of connection authentication server 108 and authentication relay section 501 of wireless LAN access point 109 to transmit and receive the IP address, EAP-IPADDR is newly defined in the message type of the EAP protocol. Then, authentication processing section 401 of connection authentication server 108 transmits the IP address to authentication relay section 501 of wireless LAN access point 109, as an attribute value of the vendor specific field of the RADIUS protocol.

Figure 8:
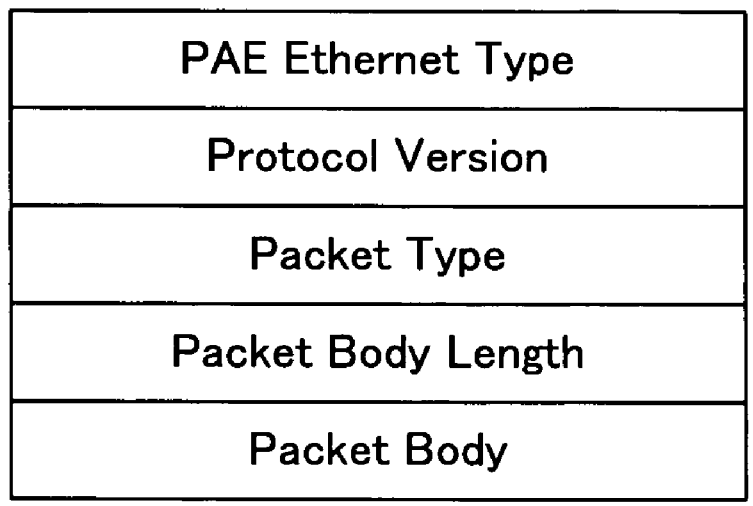
FIG. 8 is a diagram to explain the EAPOL message format for use in the mobile wireless communication system according to the embodiment of the invention.
Figure 9:
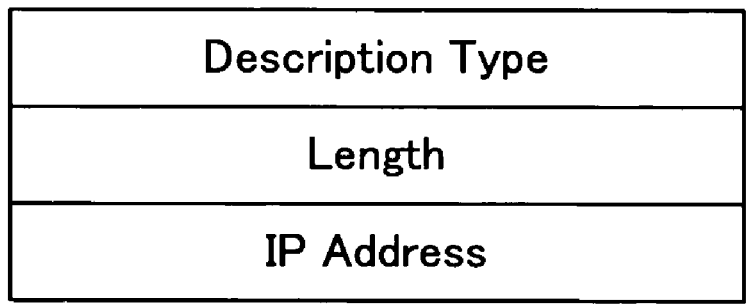
FIG. 9 is a diagram to explain the addr message format for use in the mobile wireless communication system according to the embodiment of the invention.

Meanwhile, in order for authentication processing section 201 of mobile wireless terminal apparatus 110 and authentication relay section 501 of wireless LAN access point 109 to transmit and receive the IP address, EAPOL-IPADDR is newly defined in the packet type of the EAPOL protocol as shown in FIG. 8, and an addr format (FIG. 9) is added to notify the IP address as an attribute value. Reception of this EAPOL-IPADDR message indicates reception of the IP address of virtual private network relay apparatus 105 for mobile wireless terminal apparatus 110, while indicating reception of the IP address of mobile wireless terminal apparatus 110 for wireless LAN access point 109.

Figure 7:
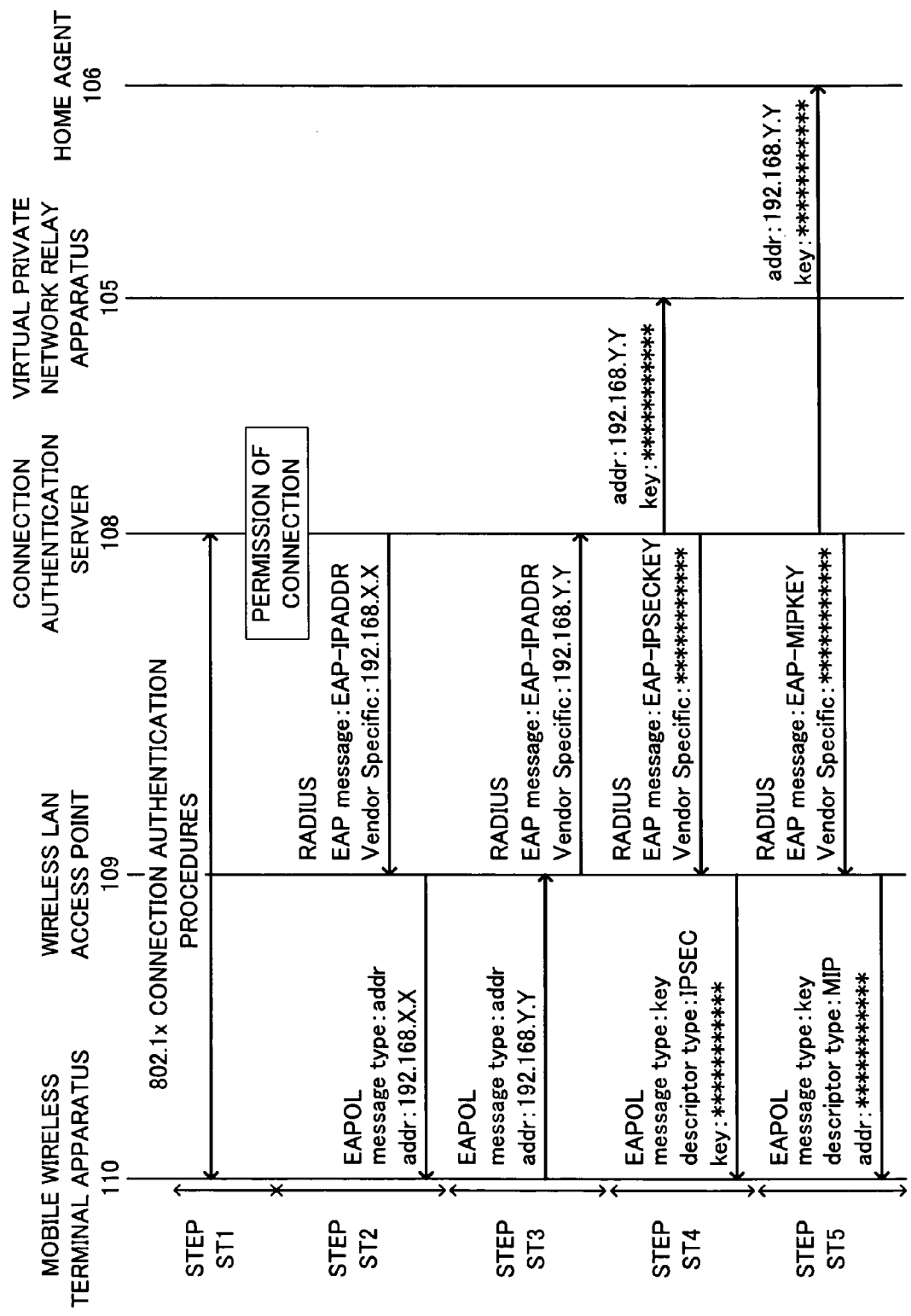
FIG. 7 is a sequence diagram to explain the mobile wireless communication system according to the embodiment of the invention.

Then, address notifying section 402 of connection authentication server 108 transmits the IP address of mobile wireless terminal apparatus 110 to address acquiring section 301 of virtual private network relay apparatus 105 (step ST4 in FIG. 7).

According to the above-mentioned procedures, mobile wireless terminal apparatus 110 and virtual private network relay apparatus 105 are capable of acquiring the IP address of the communicating party. Then, using the acquired IP address, IPsec key exchanging section 205 of mobile wireless terminal apparatus 110 and IPsec key exchanging section 303 of virtual private network relay apparatus 105 are capable of starting key exchange by IPsec main mode.

Further, using the communication path encrypted by the master secret shared between mobile wireless terminal apparatus 110 and connection authentication server 108, connection authentication server 108 distributes an IPsec pre-shared secret key for use in establishment of the IPsec tunnel performed between mobile wireless terminal apparatus 110 and virtual private network relay apparatus 105 to mobile wireless terminal apparatus 110 and virtual private network relay apparatus 105. Authentication processing section 401 of connection authentication server 108 transmits the IPsec pre-shared secret key to authentication relay section 501 of wireless LAN access point 109. Authentication relay section 501 of wireless LAN access point 109 having received the IPsec pre-shared secret key transmits the IPsec pre-shared secret key to authentication processing section 201 of mobile wireless terminal apparatus 110 without change (step ST4 in FIG. 7).

In addition, in order for authentication processing section 401 of connection authentication server 108 to transmit the IPsec pre-shared secret key to authentication processing section 201 of mobile wireless terminal apparatus 110, the EAP protocol and EAPOL protocol are extended. In order for authentication processing section 401 of connection authentication server 108 to transmit the IPsec pre-shared secret key to authentication relay section 501 of wireless LAN access point 109, EAP-IPSECKEY is newly defined in the message type of the EAP protocol. Then, the IPsec pre-shared secret key is transmitted as an attribute value of the vendor specific field of the RADIUS protocol. Meanwhile, in order for authentication relay section 501 of wireless LAN access point 109 to transmit the IPsec pre-shared secret key to authentication processing section 201 of mobile wireless terminal apparatus 110, a key distribution message of the EAPOL protocol is used. At this point, the IPsec pre-shared secret key is notified using a key field with the descriptor type of the key description format as IPsec.

Then, IPsec shared key distributing section 404 of connection authentication server 108 transmits the same IPsec pre-shared secret key as the IPsec pre-shared secret key transmitted to mobile wireless terminal apparatus 110 to IPsec shared key acquiring section 302 of virtual private network relay apparatus 105.

In addition, the communication path from connection authentication server 108 to virtual private network relay apparatus 105 statically establishes the IPsec tunnel and realizes a secure communication path such that IPsec pre-shared secret key is not sniffed. Further, the IPsec pre-shared secret key held by connection authentication server 108 can be generated dynamically by connection authentication server 108, or can be received from another key generating server.

According to the above-mentioned procedures, mobile wireless terminal apparatus 110 and virtual private network relay apparatus 105 share the same IPsec pre-shared secret key. Using the shared IPsec pre-shared secret key, IPsec key exchanging section 205 of mobile wireless terminal apparatus 110 and IPsec key exchanging section 303 of virtual private network relay apparatus 105 start key exchange by IPsec main mode. When the IPsec pre-shared secret key, IP address and user ID described in the authentication request from IPsec key exchanging section 205 of mobile wireless terminal apparatus 110 agree with the IPsec pre-shared secret key, IP address and user ID held in virtual private network relay apparatus 105, IPsec key exchanging section 303 of virtual private network relay apparatus 105 permits authentication of mobile wireless terminal apparatus 110, and establishes the IPsec tunnel.

Further, using the communication path encrypted by the master secret shared between mobile wireless terminal apparatus 110 and connection authentication server 108, connection authentication server 108 transmits an MIP pre-shared secret key that mobile wireless terminal apparatus 110 uses for registering to home agent 106, to mobile wireless terminal apparatus 110. Authentication processing section 401 of connection authentication server 108 transmits the MIP pre-shared secret key to authentication relay section 501 of wireless LAN access point 109. Authentication relay section 501 of wireless LAN access point 109 having received the MIP pre-shared secret key transmits the MIP pre-shared secret key to authentication processing section 201 of mobile wireless terminal apparatus 110.

In addition, in order for authentication processing section 401 of connection authentication server 108 to transmit the MIP pre-shared secret key to authentication processing section 201 of mobile wireless terminal apparatus 110, the EAP protocol and EAPOL protocol are extended. In order for authentication processing section 401 of connection authentication server 108 to transmit the MIP pre-shared secret key to authentication relay section 501 of wireless LAN access point 109, EAP-MIPKEY is newly defined in the message type of the EAP protocol. Then, authentication processing section 401 of connection authentication server 108 transmits the MIP pre-shared secret key to authentication relay section 501 of wireless LAN access point 109 as an attribute value of the vendor specific field of the RADIUS protocol.

Meanwhile, in order for authentication relay section 501 of wireless LAN access point 109 to transmit the MIP pre-shared secret key to authentication processing section 201 of mobile wireless terminal apparatus 110, a key distribution message of the EAPOL protocol is used. At this point, the MIP pre-shared secret key is notified using a key field with making the descriptor type of the key description format as MIP.

Then, MIP shared key distributing section 405 of connection authentication server 108 transmits the same MIP pre-shared secret key as the MIP pre-shared secret key transmitted to mobile wireless terminal apparatus 110 and the IP address of mobile wireless terminal apparatus 110 to MIP shared key acquiring section 601 of home agent 106 (step ST5 in FIG. 7).

In addition, the communication path from connection authentication server 108 to home agent 106 statically establishes the IPsec tunnel and realizes a secure communication path such that the MIP pre-shared secret key is not sniffed. Further, the MIP pre-shared secret key held by connection authentication server 108 can be generated dynamically by connection authentication server 108, or can be received from another key generating server.

According to the above-mentioned procedures, mobile wireless terminal apparatus 110 and home agent 106 share the same MIP pre-shared secret key. MIP registering section 207 of mobile wireless terminal apparatus 110 makes a mobile IP registration (Binding Update) to MIP processing section 602 of home agent 106, using the MIP pre-shared key. When the MIP pre-shared secret key and SPI described in the authentication field of the mobile IP registration message from MIP registering section 207 of mobile wireless terminal apparatus 110 agree with the MIP pre-shared secret key and SPI held in home agent 106, MIP processing section 602 of home agent 106 permits authentication of the mobile IP registration of mobile wireless terminal apparatus 110. In addition, the IPsec tunnel is already established between mobile wireless terminal apparatus 110 and virtual private network relay apparatus 105, and the communication path is thereby secure between mobile wireless terminal apparatus 110 and home agent 106.

Thus, according to the embodiment of the present invention, in a mobile VPN connection environment such that mobile wireless terminal apparatus 110 connects to a private network from a public network such as public wireless LAN system 103, it is possible to establish an IPsec tunnel by IPsec main mode. Further, according to the embodiment of the invention, it is possible to dynamically update an IPsec pre-shared key and MIP pre-shared key every time mobile wireless terminal apparatuses 110 access to public wireless LAN system 103. Hence, according to the embodiment of the invention, it is possible to prevent deterioration in security, eliminate the need of the specific operation of a user and administrator, and reduce the time required to establish an IPsec tunnel in a mobile VPN connection environment.

A mobile wireless communication system according to a first aspect of the present invention a public network, a private network and a public wireless LAN system, and employs a configuration comprising: a virtual private network relay apparatus which establishes an IPsec tunnel with a network relay apparatus installed on the private network via the public network, further establishes the IPsec tunnel with a mobile wireless terminal apparatus and relays connection of the mobile wireless terminal apparatus from the public wireless LAN system to the private network, a connection authentication server that is installed on the public wireless LAN system and authenticates connection of the mobile wireless terminal apparatus to the public wireless LAN system, and a wireless LAN access point that relays connection authentication procedures of a public wireless LAN performed between the mobile wireless terminal apparatus and the connection authentication server.

According to this configuration, the mobile wireless terminal apparatus can acquire the IP address of the virtual private network relay apparatus and the virtual private network relay apparatus can acquire the IP address of the mobile wireless terminal apparatus, so that the mobile wireless terminal apparatus and the virtual private network relay apparatus can start key exchange by IPsec main mode using IP addresses of respective parties, and it is thereby possible to prevent deterioration in security, and a specific operation of the user and administrator is not required. Further, according to this configuration, the IP address is transmitted using the secure communication path established by connection authentication procedures in the mobile wireless terminal apparatus and connection authentication server, so that a secure communication path to distribute the IP address does not need to be newly established, and it is thus possible to reduce the time required to establish the IPsec tunnel in the mobile VPN connection environment.

A mobile wireless terminal apparatus according to a second aspect of the invention is a mobile wireless terminal apparatus in a mobile wireless communication system which has a public network, a private network and a public wireless LAN system and comprises a virtual private network relay apparatus which establishes an IPsec tunnel with a network relay apparatus installed on the private network via the public network, further establishes the IPsec tunnel with the mobile wireless terminal apparatus and relays connection of the mobile wireless terminal apparatus from the public wireless LAN system to the private network, a connection authentication server that is installed on the public wireless LAN system and authenticates connection of the mobile wireless terminal apparatus to the public wireless LAN system, and a wireless LAN access point that relays connection authentication procedures of a public wireless LAN performed between the mobile wireless terminal apparatus and the connection authentication server, and employs a configuration comprising:
an authentication processing section that performs authentication processing of connection to the public wireless LAN system to the connection authentication server, an address acquiring section that acquires an IP address of the virtual private network relay apparatus from the connection authentication server when the connection to the public wireless LAN system is permitted, an address notifying section that notifies an IP address of the mobile wireless terminal apparatus to the connection authentication server, and an IPsec key exchanging section that performs an IPsec key exchange with the virtual private network relay apparatus using the IP address of the virtual private network relay apparatus.

According to this configuration, the mobile wireless terminal apparatus can acquire the IP address of the virtual private network relay apparatus and the virtual private network relay apparatus can acquire the IP address of the mobile wireless terminal apparatus, so that the mobile wireless terminal apparatus and the virtual private network relay apparatus can start key exchange by IPsec main mode using IP addresses of respective parties, and it is thereby possible to prevent deterioration in security, and a specific operation of the user and administrator is not required. Further, according to this configuration, the IP address is transmitted using the secure communication path established by connection authentication procedures in the mobile wireless terminal apparatus and connection authentication server, so that a secure communication path to distribute the IP address does not need to be newly established, and it is thus possible to reduce the time required to establish the IPsec tunnel in the mobile VPN connection environment.

A mobile wireless terminal apparatus according to a third aspect of the invention is a mobile wireless terminal apparatus in a mobile wireless communication system which has a public network, a private network and a public wireless LAN system and comprises a virtual private network relay apparatus which establishes an IPsec tunnel with a network relay apparatus installed on the private network via the public network, further establishes the IPsec tunnel with the mobile wireless terminal apparatus, and relays connection of the mobile wireless terminal apparatus from the public wireless LAN system to the private network, a connection authentication server that is installed on the public wireless LAN system and authenticates connection of the mobile wireless terminal apparatus to the public wireless LAN system, and a wireless LAN access point that relays connection authentication procedures of a public wireless LAN performed between the mobile wireless terminal apparatus and the connection authentication server, and employs a configuration comprising:
an authentication processing section that performs authentication processing of connection to the public wireless LAN system to the connection authentication server, an IPsec shared key acquiring section that acquires an IPsec pre-shared secret key for use in the IPsec key exchange performed with the virtual private network relay apparatus from the connection authentication server when the connection to the public wireless LAN system is permitted, and an IPsec key exchanging section that performs the IPsec key exchange with the virtual private network relay apparatus using the IPsec pre-shared secret key.

According to this configuration, the mobile wireless terminal apparatus and the virtual private network relay apparatus can acquire the same IPsec pre-shared secret key, and update the IPsec pre-shared secret key every time when the mobile wireless terminal apparatus connects to the public wireless LAN system, so that deterioration in security can be prevented and a specific operation of the user and administrator is not required. Further, according to this configuration, the IPsec pre-shared secret key is transmitted using the secure communication path established by connection authentication procedures in the mobile wireless terminal apparatus and connection authentication server, so that a secure communication path to distribute the IPsec pre-shared secret key does not need to be newly established, and it is thus possible to reduce the time required to establish the IPsec tunnel in the mobile VPN connection environment.

A mobile wireless terminal apparatus according to a fourth aspect of the invention is a mobile wireless terminal apparatus in a mobile wireless communication system which has a public network, a private network and a public wireless LAN system and comprises a virtual private network relay apparatus which establishes an IPsec tunnel with a network relay apparatus installed on the private network via the public network, further establishes the IPsec tunnel with the mobile wireless terminal apparatus, and relays connection of the mobile wireless terminal apparatus from the public wireless LAN system to the private network, a home agent that controls moving of the mobile wireless terminal apparatus, a connection authentication server that is installed on the public wireless LAN system and authenticates connection of the mobile wireless terminal apparatus to the public wireless LAN system, and a wireless LAN access point that relays connection authentication procedures of a public wireless LAN performed between the mobile wireless terminal apparatus and the connection authentication server, and employs a configuration comprising: an authentication processing section that performs authentication processing of connection to the public wireless LAN system to the connection authentication server, an MIP shared key acquiring section that acquires a pre-shared secret key for use in mobile IP registration made with the home agent from the connection authentication server when the connection to the public wireless LAN system is permitted, and an MIP registering section that makes the mobile IP registration to the home agent using the pre-shared secret key.

According to this configuration, the mobile wireless terminal apparatus and the home agent can acquire the same MIP pre-shared secret key, and update the MIP pre-shared secret key every time when the mobile wireless terminal apparatus connects to the public wireless LAN system, so that deterioration in security can be prevented and a specific operation of the user and administrator is not required. Further, the MIP pre-shared secret key is transmitted using the secure communication path established by connection authentication procedures in the mobile wireless terminal apparatus and connection authentication server, so that a secure communication path to distribute the MIP pre-shared secret key does not to be newly established, and it is thus possible to reduce the time required to establish the IPsec tunnel in the mobile VPN connection environment.

A mobile wireless terminal apparatus according to a fifth aspect of the invention is a mobile wireless terminal apparatus in a mobile wireless communication system which has a public network, a private network and a public wireless LAN system and comprises a virtual private network relay apparatus which establishes an IPsec tunnel with a network relay apparatus installed on the private network via the public network, further establishes the IPsec tunnel with the mobile wireless terminal apparatus, and relays connection of the mobile wireless terminal apparatus from the public wireless LAN system to the private network, a home agent that controls moving of the mobile wireless terminal apparatus, a connection authentication server that is installed on the public wireless LAN system and that authenticates connection of the mobile wireless terminal apparatus to the public wireless LAN system, and a wireless LAN access point that relays connection authentication procedures of a public wireless LAN performed between the mobile wireless terminal apparatus and the connection authentication server, and employs a configuration comprising: an authentication processing section that performs authentication processing of connection to the public wireless LAN system to the connection authentication server, an address acquiring section that acquires an IP address of the virtual private network relay apparatus from the connection authentication server when the connection to the public wireless LAN system is permitted, an address notifying section that notifies an IP address of the mobile wireless terminal apparatus to the connection authentication server, an IPsec shared key acquiring section that acquires an IPsec pre-shared secret key for use in IPsec key exchange performed with the virtual private network relay apparatus from the connection authentication server, an MIP shared key acquiring section that acquires an MIP pre-shared secret key for use in mobile IP registration made with the home agent from the connection authentication server, an IPsec key exchanging section that performs the IPsec key exchange with the virtual private network relay apparatus using the IP address of the virtual private network relay apparatus and the IPsec pre-shared secret key, and an MIP registering section that makes the mobile IP registration to the home agent using the MIP pre-shared secret key.

According to this configuration, the mobile wireless terminal apparatus can acquire the IP address of the virtual private network relay apparatus, and the virtual private network relay apparatus can acquire the IP address of the mobile wireless terminal apparatus, so that both apparatuses can start key exchange by IPsec main mode using IP addresses of respective parties, and the mobile wireless terminal apparatus and the virtual private network relay apparatus can acquire the same IPsec pre-shared secret key, and it is possible to update the IPsec pre-shared secret key every time when the mobile wireless terminal apparatus connects to the public wireless LAN system. Further, according to this configuration, the mobile wireless terminal apparatus and the home agent can acquire the same MIP pre-shared secret key, and update the MIP pre-shared secret key whenever the mobile wireless terminal apparatus connects to the public wireless LAN system. It is thereby possible to prevent deterioration in security, and specific operation of the user and administrator is not required.

Moreover, according to this configuration, the IP address, IPsec pre-shared secret key and MIP pre-shared secret key are transmitted using the secure communication path established by connection authentication procedures in the mobile wireless terminal apparatus and connection authentication server, a secure communication path to distribute them does not need to be newly established, and it is thus possible to reduce the time required to establish the IPsec tunnel in the mobile VPN connection environment.

A virtual private network relay apparatus according to a sixth aspect of the invention is a virtual private network relay apparatus in a mobile wireless communication system which has a public network, a private network and a public wireless LAN system and comprises the virtual private network relay apparatus which establishes an IPsec tunnel with a network relay apparatus installed on the private network via the public network, further establishes the IPsec tunnel with a mobile wireless terminal apparatus, and relays connection of the mobile wireless terminal apparatus from the public wireless LAN system to the private network, a connection authentication server that is installed on the public wireless LAN system and authenticates connection of the mobile wireless terminal apparatus to the public wireless LAN system, and a wireless LAN access point that relays connection authentication procedures of a public wireless LAN performed between the mobile wireless terminal apparatus and the connection authentication server, and employs a configuration comprising:

an address acquiring section that receives an IP address of the mobile wireless terminal apparatus from the connection authentication server, and an IPsec key exchanging section that performs an IPsec key exchange with the mobile wireless terminal apparatus using the IP address of the mobile wireless terminal apparatus.

According to this configuration, the virtual private network relay apparatus can acquire the IP address of the mobile wireless terminal apparatus, and thereby can start key exchange by IPsec main mode using IP address, so that deterioration in security can be prevented and specific operation of the user and administrator, and it is possible to reduce the time required to establish the IPsec tunnel in the mobile VPN connection environment.

A virtual private network relay apparatus according to a seventh aspect of the invention is a virtual private network relay apparatus in a mobile wireless communication system which has a public network, a private network and a public wireless LAN system and comprises the virtual private network relay apparatus which establishes an IPsec tunnel with a network relay apparatus installed on the private network via the public network, further establishes the IPsec tunnel with a mobile wireless terminal apparatus, and relays connection of the mobile wireless terminal apparatus from the public wireless LAN system to the private network, a connection authentication server that is installed on the public wireless LAN system and authenticates connection of the mobile wireless terminal apparatus to the public wireless LAN system, and a wireless LAN access point that relays connection authentication procedures of a public wireless LAN performed between the mobile wireless terminal apparatus and the connection authentication server, and employs a configuration comprising an IPsec shared key acquiring section that acquires a pre-shared secret key for use in an IPsec key exchange performed with the mobile wireless terminal apparatus from the connection authentication server, and an IPsec key exchanging section that performs the IPsec key exchange with the mobile wireless terminal apparatus using the pre-shared secret key.

According to this configuration, the mobile wireless terminal apparatus and the virtual private network relay apparatus can acquire the same IPsec pre-shared secret key, and update the IPsec pre-shared secret key every time when the mobile wireless terminal apparatus connects to the public wireless LAN system, so that prevent deterioration in security can be prevented and specific operation of the user and administrator is required, and it is possible to reduce the time required to establish the IPsec tunnel in the mobile VPN connection environment.

A virtual private network relay apparatus according to an eighth aspect of the invention is a virtual private network relay apparatus in a mobile wireless communication system which has a public network, a private network and a public wireless LAN system and comprises the virtual private network relay apparatus which establishes an IPsec tunnel with a network relay apparatus installed on the private network via the public network, further establishes the IPsec tunnel with a mobile wireless terminal apparatus, and relays connection of the mobile wireless terminal apparatus from the public wireless LAN system to the private network, a connection authentication server that is installed on the public wireless LAN system and authenticates connection of the mobile wireless terminal apparatus to the public wireless LAN system, and a wireless LAN access point that relays connection authentication procedures of a public wireless LAN performed between the mobile wireless terminal apparatus and the connection authentication server, and employs a configuration comprising an address acquiring section that receives an IP address of the mobile wireless terminal apparatus from the connection authentication server, an IPsec shared key acquiring section that receives a pre-shared secret key for use in an IPsec key exchange performed with the mobile wireless terminal apparatus from the connection authentication server, and an IPsec key exchanging section that performs exchange of the IPsec key with the mobile wireless terminal apparatus using the IP address of the mobile wireless terminal apparatus and the pre-shared secret key.

According to this configuration, the virtual private network relay apparatus can acquire the IP address of the mobile wireless terminal apparatus, and thereby can start key exchange by IPsec main mode using IP address. Further, according to this configuration, the mobile wireless terminal apparatus and the virtual private network relay apparatus can acquire the same IPsec pre-shared secret key, and update the IPsec pre-shared secret key every time when the mobile wireless terminal apparatus connects to the public wireless LAN system. It is thus possible to prevent deterioration in security, specific operation of the user and administrator is not required, and it is possible to reduce the time required to establish the IPsec tunnel in the mobile VPN connection environment.

A connection authentication server according to a ninth aspect of the invention is a connection authentication server in a mobile wireless communication system which has a public network, a private network and a public wireless LAN system and comprises a virtual private network relay apparatus which establishes an IPsec tunnel with a network relay apparatus installed on the private network via the public network, further establishes the IPsec tunnel with a mobile wireless terminal apparatus and relays connection of the mobile wireless terminal apparatus from the public wireless LAN system to the private network, the connection authentication server that is installed on the public wireless LAN system and that authenticates connection of the mobile wireless terminal apparatus to the public wireless LAN system, and a wireless LAN access point that relays connection authentication procedures of a public wireless LAN performed between the mobile wireless terminal apparatus and the connection authentication server, and employs a configuration comprising an authentication processing section that authenticates connection of the mobile wireless terminal apparatus to the public wireless LAN system, an address acquiring section that receives an IP address of the mobile wireless terminal apparatus from the mobile wireless terminal apparatus when permitting the connection of the mobile wireless terminal apparatus to the public wireless LAN system, and an address notifying section that notifies an IP address of the virtual private network relay apparatus to the mobile wireless terminal apparatus and notifies the IP address of the mobile wireless terminal apparatus to the virtual private network relay apparatus.

According to this configuration, the mobile wireless terminal apparatus can acquire the IP address of the virtual private network relay apparatus, and the virtual private network relay apparatus can acquire the IP address of the mobile wireless terminal apparatus, so that the mobile wireless terminal apparatus and the virtual private network relay apparatus can start key exchange by IPsec main mode using IP addresses of respective parties and it is thereby possible to prevent deterioration in security, and specific operation of the user and administrator is not required. Further, according to this configuration, the IP address is transmitted using the secure communication path established by connection authentication procedures in the mobile wireless terminal apparatus and connection authentication server, so that a secure communication path to distribute the IP address does not need to be newly established, and it is thus possible to reduce the time required to establish the IPsec tunnel in the mobile VPN connection environment.

A connection authentication server according to a tenth aspect of the invention is a connection authentication server in a mobile wireless communication system which has a public network, a private network and a public wireless LAN system and comprises a virtual private network relay apparatus which establishes an IPsec tunnel with a network relay apparatus installed on the private network via the public network, further establishes the IPsec tunnel with a mobile wireless terminal apparatus and relays connection of the mobile wireless terminal apparatus from the public wireless LAN system to the private network, the connection authentication server that is installed on the public wireless LAN system and that authenticates connection of the mobile wireless terminal apparatus to the public wireless LAN system, and a wireless LAN access point that relays connection authentication procedures of a public wireless LAN performed between the mobile wireless terminal apparatus and the connection authentication server, and employs a configuration comprising an authentication processing section that authenticates connection of the mobile wireless terminal apparatus to the public wireless LAN system, and an IPsec shared key distributing section that distributes a pre-shared secret key, for use in an IPsec key exchange performed between the mobile wireless terminal apparatus and the virtual private network relay apparatus, to the mobile wireless terminal apparatus and the virtual private network relay apparatus when permitting the connection of the mobile wireless terminal apparatus to the public wireless LAN system.

According to this configuration, the mobile wireless terminal apparatus and the virtual private network relay apparatus can acquire the same IPsec pre-shared secret key, and update the IPsec pre-shared secret key every time when the mobile wireless terminal apparatus connects to the public wireless LAN system, so that deterioration in security can be prevented and specific operation of the user and administrator is not required. Further, according to this configuration, the IPsec pre-shared secret key is transmitted using the secure communication path established by connection authentication procedures in the mobile wireless terminal apparatus and connection authentication server, a secure communication path to distribute the IPsec pre-shared secret key does not need to be newly established, and it is thus possible to reduce the time required to establish the IPsec tunnel in the mobile VPN connection environment.

A connection authentication server according to an eleventh aspect of the invention is a connection authentication server in a mobile wireless communication system which has a public network, a private network and a public wireless LAN system and comprises a virtual private network relay apparatus which establishes an IPsec tunnel with a network relay apparatus installed on the private network via the public network, further establishes the IPsec tunnel with a mobile wireless terminal apparatus and relays connection of the mobile wireless terminal apparatus from the public wireless LAN system to the private network, a home agent that controls moving of the mobile wireless terminal apparatus, the connection authentication server that is installed on the public wireless LAN system and authenticates connection of the mobile wireless terminal apparatus to the public wireless LAN system, and a wireless LAN access point that relays connection authentication procedures of a public wireless LAN performed between the mobile wireless terminal apparatus and the connection authentication server, and employs a configuration comprising an authentication processing section that authenticates connection of the mobile wireless terminal apparatus to the public wireless LAN system, and an MIP shared key distributing section that distributes a pre-shared secret key, for use in mobile IP registration performed between the mobile wireless terminal apparatus and the home agent, to the mobile wireless terminal apparatus and the home agent when permitting the connection of the mobile wireless terminal apparatus to the public wireless LAN system.

According to this configuration, the mobile wireless terminal apparatus and the home agent can acquire the same MIP pre-shared secret key, and update the MIP pre-shared secret key every time when the mobile wireless terminal apparatus connects to the public wireless LAN system, so that deterioration insecurity can be prevented and specific operation of the user and administrator is not required. Further, according to this configuration, the MIP pre-shared secret key is transmitted using the secure communication path established by connection authentication procedures in the mobile wireless terminal apparatus and connection authentication server, so that a secure communication path to distribute the MIP pre-shared secret key does not need to be newly established, and it is thus possible to reduce the time required to establish the IPsec tunnel in the mobile VPN connection environment.

A connection authentication server according to a twelfth aspect of the invention is a connection authentication server in a mobile wireless communication system which has a public network, a private network and a public wireless LAN system and comprises a virtual private network relay apparatus which establishes an IPsec tunnel with a network relay apparatus installed on the private network via the public network, further establishes the IPsec tunnel with a mobile wireless terminal apparatus and relays connection of the mobile wireless terminal apparatus from the public wireless LAN system to the private network, a home agent that controls moving of the mobile wireless terminal apparatus, the connection authentication server that is installed on the public wireless LAN system and authenticates connection of the mobile wireless terminal apparatus to the public wireless LAN system, and a wireless LAN access point that relays connection authentication procedures of a public wireless LAN performed between the mobile wireless terminal apparatus and the connection authentication server, and employs a configuration comprising an authentication processing section that authenticates connection of the mobile wireless terminal apparatus to the public wireless LAN system, an address acquiring section that receives an IP address of the mobile wireless terminal apparatus from the mobile wireless terminal apparatus when permitting the connection of the mobile wireless terminal apparatus to the public wireless LAN system, an address notifying section that notifies an IP address of the virtual private network relay apparatus to the mobile wireless terminal apparatus and notifies the IP address of the mobile wireless terminal apparatus to the virtual private network relay apparatus, an IPsec shared key distributing section that distributes an IPsec pre-shared secret key, for use in an IPsec key exchange performed between the mobile wireless terminal apparatus and the virtual private network relay apparatus, to the mobile wireless terminal apparatus and the virtual private network relay apparatus, and an MIP shared key distributing section that distributes an MIP pre-shared secret key, for use in mobile IP registration performed between the mobile wireless terminal apparatus and the home agent, to the mobile wireless terminal apparatus and the home agent.

According to this configuration, the mobile wireless terminal apparatus can acquire the IP address of the virtual private network relay apparatus and the virtual private network relay apparatus can acquire the IP address of the mobile wireless terminal apparatus, so that the mobile wireless terminal apparatus and the virtual private network relay apparatus can start establishing the tunnel by IPsec main mode using IP addresses of respective parties. Further, according to this configuration, the mobile wireless terminal apparatus and the virtual private network relay apparatus can acquire the same IPsec pre-shared secret key, and update the IPsec pre-shared secret key every time when the mobile wireless terminal apparatus connects to the public wireless LAN system.

Furthermore, according to this configuration, the mobile wireless terminal apparatus and the home agent can acquire the same MIP pre-shared secret key, and update the MIP pre-shared secret key every time when the mobile wireless terminal apparatus connects to the public wireless LAN system. It is thereby possible to prevent deterioration in security and specific operation of the user and administrator is not required.

Moreover, according to this configuration, the IP address, IPsec pre-shared secret key and MIP pre-shared secret key are transmitted using the secure communication path established by connection authentication procedures in the mobile wireless terminal apparatus and connection authentication server, so that a secure communication path to distribute them does not need to be newly established, and it is thus possible to reduce the time required to establish the IPsec tunnel in the mobile VPN connection environment.

A wireless LAN access point according to a thirteenth aspect of the invention is a wireless LAN access point in a mobile wireless communication system which has a public network, a private network and a public wireless LAN system and comprises a virtual private network relay apparatus which establishes an IPsec tunnel with a network relay apparatus installed on the private network via the public network, further establishes the IPsec tunnel with a mobile wireless terminal apparatus and relays connection of the mobile wireless terminal apparatus from the public wireless LAN system to the private network, a home agent that controls moving of the mobile wireless terminal apparatus, a connection authentication server that is installed on the public wireless LAN system and authenticates connection of the mobile wireless terminal apparatus to the public wireless LAN system, and the wireless LAN access point that relays connection authentication procedures of a public wireless LAN performed between the mobile wireless terminal apparatus and the connection authentication server, and employs a configuration comprising an authentication relay section that transmits to the mobile wireless terminal apparatus an IP address, an IPsec pre-shared key and a Mobile IP pre-shared key transmitted from the connection authentication server and transmits an IP address transmitted from the mobile wireless terminal apparatus to the connection authentication server, using a secure communication path established in the connection authentication procedures of the public wireless LAN performed between the mobile wireless terminal apparatus and the connection authentication server.

According to this configuration, the mobile wireless terminal apparatus can acquire the IP address of the virtual private network relay apparatus and the virtual private network relay apparatus can acquire the IP address of the mobile wireless terminal apparatus, so that the mobile wireless terminal apparatus and the virtual private network relay apparatus can start key exchange by IPsec main mode using IP addresses of respective parties. Further, according to this configuration, the mobile wireless terminal apparatus and the virtual private network relay apparatus can acquire the same IPsec pre-shared secret key, and update the IPsec pre-shared secret key every time when the mobile wireless terminal apparatus connects to the public wireless LAN system. It is thereby possible to prevent deterioration in security and specific operation of the user and administrator is not required.

Moreover, according to this configuration, the IP address, IPsec pre-shared secret key and MIP pre-shared secret key are transmitted using the secure communication path established by connection authentication procedures in the mobile wireless terminal apparatus and connection authentication server, so that a secure communication path to distribute them does not need to be newly established, and it is thus possible to reduce the time required to establish the IPsec tunnel in the mobile VPN connection environment.

A home agent according to a fourteenth aspect of the invention is a home agent in a mobile wireless communication system which has a public network, a private network and a public wireless LAN system and comprises a virtual private network relay apparatus which establishes an IPsec tunnel with a network relay apparatus installed on the private network via the public network, further establishes the IPsec tunnel with a mobile wireless terminal apparatus and relays connection of the mobile wireless terminal apparatus from the public wireless LAN system to the private network, the home agent that controls moving of the mobile wireless terminal apparatus, a connection authentication server that is installed on the public wireless LAN system and authenticates connection of the mobile wireless terminal apparatus to the public wireless LAN system, and a wireless LAN access point that relays connection authentication procedures of a public wireless LAN performed between the mobile wireless terminal apparatus and the connection authentication server, and employs a configuration comprising an MIP shared key acquiring section that receives a pre-shared secret key for use in mobile IP registration of the mobile wireless terminal apparatus from the connection authentication server, and an MIP processing section that processes the mobile IP registration from the mobile wireless terminal apparatus using the pre-shared secret key.

According to this configuration, the home agent can acquire the MIP pre-shared secret key, and update the MIP pre-shared secret key every time when the mobile wireless terminal apparatus connects to the public wireless LAN system, so that deterioration in security can be prevented, and specific operation of the user and administrator is not required and it is possible to reduce the time required to establish the IPsec tunnel in the mobile VPN connection environment.

The present application is based on Japanese Patent Application No. 2004-008507 filed on Jan. 15, 2004, entire content of which is expressly incorporated by reference herein.

INDUSTRIAL APPLICABILITY

The present invention is suitable for a mobile wireless communication system that provides a mobile VPN environment such that mobile wireless terminal apparatuses gain access to private networks from a public wireless LAN system via a public network.

The invention claimed is:

1. A mobile wireless terminal apparatus in a mobile wireless communication system which has a public network, a private network and a public wireless LAN system and comprises:
a virtual private network relay apparatus which establishes an IPsec tunnel with a network relay apparatus installed on the private network via the public network, further establishes the IPsec tunnel with the mobile wireless terminal apparatus and relays connection of the mobile wireless terminal apparatus from the public wireless LAN system to the private network,
a connection authentication server that is installed on the public wireless LAN system and authenticates connection of the mobile wireless terminal apparatus to the public wireless LAN system, and
a wireless LAN access point that relays connection authentication procedures of the public wireless LAN performed between the mobile wireless terminal apparatus and the connection authentication server, the mobile wireless terminal apparatus comprising:
an authentication processing section that performs authentication processing for connection to the public wireless LAN system and to the connection authentication server;
an address acquiring section that acquires an IP address of the virtual private network relay apparatus from the connection authentication server when the connection to the public wireless LAN system is permitted;
an address notifying section that sends an IP address of the mobile wireless terminal apparatus to the virtual private network relay apparatus that performs an IPsec key exchange with the mobile wireless terminal apparatus using the IP address of the mobile wireless terminal, via the connection authentication server, when the connection to the public wireless LAN system is permitted; and
an IPsec key exchanging section that performs the IPsec key exchange with the virtual private network relay apparatus using the IP address of the virtual private network relay apparatus, wherein the IPsec key exchange is performed by IPsec main mode.

2. The mobile wireless terminal apparatus according to claim 1, wherein an IPsec tunnel is statically established between the virtual private network relay apparatus and the connection authentication server.

3. The mobile wireless terminal apparatus according to claim 1, wherein
the address acquiring section that acquires the IP address of the virtual private network relay apparatus from the connection authentication server uses a communication path encrypted by a key generated when the connection authentication server succeeds in authenticating the mobile wireless terminal apparatus, and
the address notifying section that sends the IP address of the mobile wireless terminal apparatus to the virtual private network relay apparatus uses the communication path.

4. A mobile wireless terminal apparatus in a mobile wireless communication system which has a public network, a private network and a public wireless LAN system and comprises:
a virtual private network relay apparatus which establishes an IPsec tunnel with a network relay apparatus installed on the private network via the public network, further establishes the IPsec tunnel with the mobile wireless terminal apparatus and relays connection of the mobile wireless terminal apparatus from the public wireless LAN system to the private network,
a home agent that controls movement of the mobile wireless terminal apparatus,
a connection authentication server that is installed on the public wireless LAN system and authenticates connection of the mobile wireless terminal apparatus to the public wireless LAN system, and
a wireless LAN access point that relays connection authentication procedures of the public wireless LAN performed between the mobile wireless terminal apparatus and the connection authentication server, the mobile wireless terminal apparatus comprising:
an authentication processing section that performs authentication processing for connection to the public wireless LAN system and to the connection authentication server;
an address acquiring section that acquires an IP address of the virtual private network relay apparatus from the connection authentication server when the connection to the public wireless LAN system is permitted;
an address notifying section that sends an IP address of the mobile wireless terminal apparatus to the virtual private network relay apparatus that performs an IPsec key exchange with the mobile wireless terminal apparatus using the IP address of the mobile wireless terminal, via the connection authentication server, when the connection to the public wireless LAN system is permitted;
an IPsec shared key acquiring section that acquires an IPsec pre-shared secret key, from the connection authentication server, for use in the IPsec key exchange performed with the virtual private network relay apparatus;
an MIP shared key acquiring section that acquires an MIP pre-shared secret key, from the connection authentication server, for use in mobile IP registration with the home agent;
an IPsec key exchanging section that performs of the IPsec key exchange with the virtual private network relay apparatus using the IPsec pre-shared secret key, wherein the IPsec key exchange is performed by IPsec main mode; and
an MIP registering section that initiates the mobile IP registration to the home agent using the MIP pre-shared secret key.

5. The mobile wireless terminal apparatus according to claim 4, wherein an IPsec tunnel is statically established between the virtual private network relay apparatus and the connection authentication server.

6. The mobile wireless terminal apparatus according to claim 4, wherein
the address acquiring section that acquires the IP address of the virtual private network relay apparatus from the connection authentication server uses a communication path encrypted by a key generated when the connection authentication server succeeds in authenticating the mobile wireless terminal apparatus, and
the address notifying section that sends the IP address of the mobile wireless terminal apparatus to the virtual private network relay apparatus uses the communication path.

7. A mobile wireless terminal apparatus comprising:
an authentication processing section that performs authentication processing for connection to a public wireless LAN system and to a connection authentication server;

an address acquiring section that acquires an IP address of a virtual private network relay apparatus from the connection authentication server when the connection to the public wireless LAN system is permitted;

an address notifying section that sends an IP address of the mobile wireless terminal apparatus to the virtual private network relay apparatus that performs an IPsec key exchange with the mobile wireless terminal apparatus using the IP address of the mobile wireless terminal, via the connection authentication server, when the connection to the public wireless LAN system is permitted; and an IPsec key exchanging section that performs the IPsec key exchange with the virtual private network relay apparatus using the IP address of the virtual private network relay apparatus, wherein the IPsec key exchange is performed by IPsec main mode.

8. The mobile wireless terminal apparatus according to claim 7, wherein an IPsec tunnel is statically established between the virtual private network relay apparatus and the connection authentication server.

9. The mobile wireless terminal apparatus according to claim 7, wherein the address acquiring section that acquires the IP address of the virtual private network relay apparatus from the connection authentication server uses a communication path encrypted by a key generated when the connection authentication server succeeds in authenticating the mobile wireless terminal apparatus, and the address notifying section that sends the IP address of the mobile wireless terminal apparatus to the virtual private network relay apparatus uses the communication path.

10. A mobile wireless terminal apparatus comprising:

an authentication processing section that performs authentication processing for connection to a public wireless LAN system and to a connection authentication server;

an address acquiring section that acquires an IP address of a virtual private network relay apparatus from the connection authentication server when the connection to the public wireless LAN system is permitted;

an address notifying section that sends an IP address of the mobile wireless terminal apparatus to the virtual private network relay apparatus that performs an IPsec key exchange with the mobile wireless terminal apparatus using the IP address of the mobile wireless terminal, via the connection authentication server, when the connection to the public wireless LAN system is permitted;

an IPsec shared key acquiring section that acquires an IPsec pre-shared secret key, from the connection authentication server, for use in the IPsec key exchange performed with the virtual private network relay apparatus;

an MIP shared key acquiring section that acquires an MIP pre-shared secret key, from the connection authentication server, for use in mobile IP registration with a home agent;

an IPsec key exchanging section that performs of the IPsec key exchange with the virtual private network relay apparatus using the IPsec pre-shared secret key, wherein the IPsec key exchange is performed by IPsec main mode; and an MIP registering section that initiates the mobile IP registration to the home agent using the MIP pre-shared secret key.

11. The mobile wireless terminal apparatus according to claim 10, wherein an IPsec tunnel is statically established between the virtual private network relay apparatus and the connection authentication server.

12. The mobile wireless terminal apparatus according to claim 10, wherein the address acquiring section that acquires the IP address of the virtual private network relay apparatus from the connection authentication server uses a communication path encrypted by a key generated when the connection authentication server succeeds in authenticating the mobile wireless terminal apparatus, and the address notifying section that sends the IP address of the mobile wireless terminal apparatus to the virtual private network relay apparatus uses the communication path.

* * * * *